United States Patent
Yue et al.

(10) Patent No.: US 10,013,985 B2
(45) Date of Patent: Jul. 3, 2018

(54) SYSTEMS AND METHODS FOR AUDIO COMMAND RECOGNITION WITH SPEAKER AUTHENTICATION

(71) Applicant: Tencent Technology (Shenzhen) Company Limited, Shenzhen (CN)

(72) Inventors: Shuai Yue, Shenzhen (CN); Xiang Zhang, Shenzhen (CN); Li Lu, Shenzhen (CN); Feng Rao, Shenzhen (CN); Eryu Wang, Shenzhen (CN); Haibo Liu, Shenzhen (CN); Bo Chen, Shenzhen (CN); Jian Liu, Shenzhen (CN); Lu Li, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 32 days.

(21) Appl. No.: 14/958,606

(22) Filed: Dec. 3, 2015

(65) Prior Publication Data
US 2016/0086609 A1    Mar. 24, 2016

Related U.S. Application Data

(63) Continuation of application No. PCT/CN2014/079766, filed on Jun. 12, 2014.

(30) Foreign Application Priority Data

Dec. 3, 2013    (CN) .......................... 2013 1 0645815

(51) Int. Cl.
*G10L 17/24* (2013.01)
*G10L 17/02* (2013.01)
(Continued)

(52) U.S. Cl.
CPC .............. *G10L 17/24* (2013.01); *G06F 3/167* (2013.01); *G10L 15/22* (2013.01); *G10L 17/02* (2013.01);
(Continued)

(58) Field of Classification Search
CPC ......... G10L 17/00; G10L 17/02; G10L 17/04; G10L 17/06; G10L 17/08; G10L 17/12; G10L 17/16; G10L 17/22; G10L 17/24
(Continued)

(56) References Cited

U.S. PATENT DOCUMENTS 6,107,935 A * 8/2000 Comerford ............. G10L 17/06
                                                    704/246
6,108,628 A * 8/2000 Komori ................. G10L 15/142
                                                    704/238
(Continued)

FOREIGN PATENT DOCUMENTS

CN    101441869 A    5/2009
CN    102194455 A    9/2011
(Continued)

OTHER PUBLICATIONS

Tencent Technology, Written Opinion, PCT/CN2014/079766, dated Sep. 23, 2014, 5 pgs.
(Continued)

*Primary Examiner* — Martin Lerner
(74) *Attorney, Agent, or Firm* — Morgan, Lewis & Bockius LLP

(57) ABSTRACT

The present application discloses a method, an electronic system and a non-transitory computer readable storage medium for recognizing audio commands in an electronic device. The electronic device obtains audio data based on an audio signal provided by a user and extracts characteristic audio fingerprint features from the audio data. The electronic
(Continued)

device further determines whether the corresponding audio signal is generated by an authorized user by comparing the characteristic audio fingerprint features with an audio fingerprint model for the authorized user and with a universal background model that represents user-independent audio fingerprint features, respectively. When the corresponding audio signal is generated by the authorized user of the electronic device, an audio command is extracted from the audio data, and an operation is performed according to the audio command.

17 Claims, 5 Drawing Sheets

(51) Int. Cl.
*G10L 17/04* (2013.01)
*G06F 3/16* (2006.01)
*G10L 17/16* (2013.01)
*G10L 17/26* (2013.01)
*G10L 15/22* (2006.01)

(52) U.S. Cl.
CPC ............ *G10L 17/16* (2013.01); *G10L 17/26* (2013.01); *G10L 2015/223* (2013.01)

(58) Field of Classification Search
USPC ....... 704/233, 240, 246, 250, 255, 275, 243, 704/273
See application file for complete search history.

(56) References Cited

U.S. PATENT DOCUMENTS

| | | | | |
|---|---|---|---|---|
| 6,519,563 B1* | 2/2003 | Lee | ........................ | G10L 17/04 704/246 |
| 6,965,863 B1* | 11/2005 | Zuberec | ................. | G10L 15/22 704/251 |
| 7,162,641 B1* | 1/2007 | Chaudhari | .............. | G10L 17/06 704/246 |
| 7,318,032 B1* | 1/2008 | Chaudhari | .............. | G10L 17/08 704/246 |
| 7,769,583 B2* | 8/2010 | Chaudhari | .............. | G10L 17/06 704/246 |
| 7,822,605 B2* | 10/2010 | Zigel | ....................... | G10L 17/06 704/246 |
| 8,024,183 B2* | 9/2011 | Navratil | ................. | G10L 17/20 704/225 |
| 8,099,288 B2* | 1/2012 | Zhang | ..................... | G10L 17/14 704/250 |
| 8,346,543 B2* | 1/2013 | Chen | ....................... | G10L 15/20 704/233 |
| 9,466,289 B2* | 10/2016 | Lu | ........................... | G10L 15/063 |
| 9,626,971 B2* | 4/2017 | Rodriguez | .............. | G10L 17/04 |
| 9,805,715 B2* | 10/2017 | Yue | .......................... | G10L 15/14 |
| 2005/0038649 A1* | 2/2005 | Billa | ....................... | G10L 15/28 704/231 |
| 2005/0049871 A1* | 3/2005 | Gong | ..................... | G10L 15/04 704/255 |
| 2005/0273328 A1 | 12/2005 | Padhi et al. | | |
| 2006/0149552 A1 | 7/2006 | Bogdanov | | |
| 2008/0059176 A1* | 3/2008 | Ravi | ....................... | G10L 17/10 704/250 |
| 2008/0208581 A1* | 8/2008 | Pelecanos | ............... | G10L 17/04 704/250 |
| 2008/0249771 A1* | 10/2008 | Wahab | .................... | G10L 25/78 704/233 |
| 2009/0119103 A1* | 5/2009 | Gerl | ........................ | G10L 17/04 704/243 |
| 2009/0228272 A1* | 9/2009 | Herbig | .................... | G10L 25/78 704/233 |
| 2010/0223056 A1* | 9/2010 | Kadirkamanathan | ... | G10L 15/02 704/253 |
| 2013/0253925 A1* | 9/2013 | Jonsson | .................. | G10L 15/20 704/233 |
| 2014/0214416 A1* | 7/2014 | Yue | ........................ | G10L 15/083 704/231 |
| 2014/0278397 A1* | 9/2014 | Chen | ....................... | G10L 21/02 704/246 |
| 2015/0154953 A1* | 6/2015 | Bapat | ...................... | G10L 15/06 704/251 |
| 2015/0245154 A1* | 8/2015 | Dadu | ...................... | G10L 17/22 381/56 |

FOREIGN PATENT DOCUMENTS

| | | |
|---|---|---|
| CN | 102238189 A | 11/2011 |
| CN | 102316162 A | 1/2012 |
| CN | 102510426 A | 6/2012 |
| EP | 2058797 A1 | 5/2009 |

OTHER PUBLICATIONS

Tencent Technology, IPRP, PCT/CN2014/079766, dated Jun. 7, 2016, 6 pgs.

Tencent Technology, ISR, PCT/CN2014/079766, dated Sep. 23, 2014, 4 pgs.

* cited by examiner

Obtaining a universal background model (UBM) and an audio fingerprint model of an authorized user 101

Wherein the audio fingerprint model of the authorized user is established based on a plurality of training audio data provided by the authorized user Obtaining audio data based on an audio signal provided by a user and detected by the electronic device;
extracting characteristic audio fingerprint features in the audio data;
determining whether the corresponding audio signal is generated by an authorized user of the electronic device by comparing the characteristic audio fingerprint features in the audio data with the audio fingerprint model for the authorized user and with the UBM 102

In accordance with the determination that the corresponding audio signal is generated by the authorized user of the electronic device, extracting an audio command from the audio data and performing an operation in accordance with the audio command provided by the authorized user 103

SYSTEMS AND METHODS FOR AUDIO COMMAND RECOGNITION WITH SPEAKER AUTHENTICATION

RELATED APPLICATIONS

This application is a continuation application of PCT Patent Application No. PCT/CN2014/079766, entitled "SYSTEMS AND METHODS FOR AUDIO COMMAND RECOGNITION" filed on Jun. 12, 2014, which claims priority to Chinese Patent Application No. 201310645815.0, entitled "METHOD AND APPARATUS FOR VOICE COMMAND RECOGNITION", filed on Dec. 3, 2013, both of which are incorporated by reference in their entirety.

TECHNICAL FIELD

The disclosed implementations of the application relate generally to the field of automatic speech recognition (ASR), and in particular, to systems, methods and devices for recognizing audio commands from an audio signal provided by an authorized user.

BACKGROUND

Automatic speech recognition (ASR) is the conversion of lexical content in a human speech to data that are readable by computers. Speech recognition normally involves a complicated speech processing process including speech decoding that follows establishing a language model and a decoder network. Audio command recognition is a specific application of the ASR technology. Audio command recognition allows a user to speak out an audio command without using a keyboard, mouse, touch screen, or other input equipments. A specific system used for audio command recognition automatically recognizes the audio command, associates the recognized audio command with an instruction, and triggers an operation on a corresponding electronic device according to the instruction.

Specifically, an audio wakeup system is a typical system that utilizes audio command recognition. A user may speak out a sound signal that includes a wakeup command. The audio wakeup system receives and recognizes the sound signal spoken out by the user, and wakes up (i.e., starts up) the corresponding electronic device from a sleep mode if the wakeup command is correctly recognized. In such an audio wakeup system, the command recognition accuracy is generally evaluated based on a false recognition rate and a no-recognition rate. The false recognition rate is associated with a situation when the system erroneously wakes up the electronic device upon a sound signal that does not include the wakeup command. The no-recognition rate is associated with another situation when the system does not respond to the sound signal that includes the wakeup command (i.e., fails to wake up the electronic device). A low false recognition rate or a low no-recognition rate indicates that the system of audio command recognition is accurate and stable.

Despite acceptable performance of audio command recognition, many audio command recognition systems do not distinguish whether the audio command comes from an authorized user of the electronic device. Anyone other than an authorized user can speak and issue the wakeup command to the audio command recognition system installed on a private electronic device, and this system always responds to the wakeup command by waking up the private electronic device. The risk of false use is significantly increased and causes a threat to the security of the electronic device. It would be beneficial to have a more secure command recognition mechanism than the current practice.

SUMMARY

The above deficiencies and other problems associated with the conventional approaches of recognizing audio commands from a sound signal are reduced or eliminated by the application disclosed below. In some embodiments, the application is implemented in an electronic device that has one or more processors, memory and one or more modules, programs or sets of instructions stored in the memory for performing multiple functions. Instructions for performing these functions may be included in a computer program product configured for execution by one or more processors.

One aspect of the application is a method for recognizing audio commands in an electronic device. The method is implemented at an electronic device having one or more processors and memory storing program modules to be executed by the one or more processors. The method includes obtaining audio data based on an audio signal provided by a user and detected by the electronic device, and extracting characteristic audio fingerprint features in the audio data. The method further includes determining whether the corresponding audio signal is generated by an authorized user of the electronic device by comparing the characteristic audio fingerprint features in the audio data with a predetermined audio fingerprint model for the authorized user and with a predetermined universal background model (UBM) that represents user-independent audio fingerprint features, respectively. The method further includes in accordance with the determination that the corresponding audio signal is generated by the authorized user of the electronic device, extracting an audio command from the audio data and performing an operation in accordance with the audio command provided by the authorized user.

Another aspect of the application is an electronic device that one or more processors and memory having instructions stored thereon, which when executed by the one or more processors cause the processors to perform operations to obtain audio data based on an audio signal provided by a user and detected by the electronic device and extract characteristic audio fingerprint features in the audio data. The at least one program further includes instructions to determine whether the corresponding audio signal is generated by an authorized user of the electronic device by comparing the characteristic audio fingerprint features in the audio data with a predetermined audio fingerprint model for the authorized user and with a predetermined universal background model (UBM) that represents user-independent audio fingerprint features, respectively. The at least one program further includes instructions to in accordance with the determination that the corresponding audio signal is generated by the authorized user of the electronic device, extract an audio command from the audio data and perform an operation in accordance with the audio command provided by the authorized user.

Another aspect of the application is a non-transitory computer readable storage medium storing at least one program configured for execution by at least one processor of an electronic device. The at least one program includes instructions to obtain audio data based on an audio signal provided by a user and detected by the electronic device and extract characteristic audio fingerprint features in the audio data. The at least one program further includes instructions to determine whether the corresponding audio signal is generated by an authorized user of the electronic device by comparing the characteristic audio fingerprint features in the audio data with a predetermined audio fingerprint model for the authorized user and with a predetermined universal background model (UBM) that represents user-independent audio fingerprint features, respectively. The at least one program further includes instructions to in accordance with the determination that the corresponding audio signal is generated by the authorized user of the electronic device, extract an audio command from the audio data and perform an operation in accordance with the audio command provided by the authorized user.

Other embodiments and advantages may be apparent to those skilled in the art in light of the descriptions and drawings in this specification.

BRIEF DESCRIPTION OF DRAWINGS

The aforementioned features and advantages of the application as well as additional features and advantages thereof will be more clearly understood hereinafter as a result of a detailed description of preferred embodiments when taken in conjunction with the drawings.

FIG. 1A is a flow chart of an exemplary method for audio command recognition according to some embodiment of the application.

Like reference numerals refer to corresponding parts throughout the several views of the drawings.

DETAILED DESCRIPTION

Figure 1B:
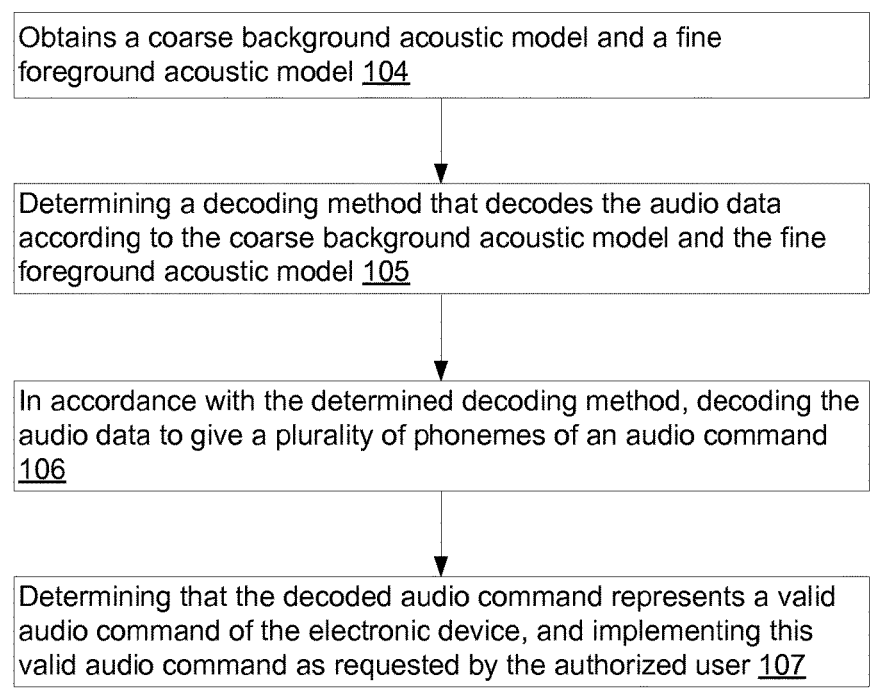
FIG. 1B is a flow chart of an exemplary method 150 of extracting an audio command from the audio data provided by the authorized user according to some embodiment of the application.

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. The appended drawings, however, merely illustrate the more pertinent features of the present disclosure and are therefore not to be considered limiting, for the description may admit to other effective features. In other instances, well-known methods, procedures, components, and circuits have not been described in detail so as not to unnecessarily obscure aspects of the embodiments.

Every person has a unique voice that is distinct from any other person. Such a unique voice can be utilized as an audio fingerprint for each individual person to identify the specific person that owns the voice. In a specific example, only when the authorized user is identified based on his or her audio fingerprint, the electronic device is activated from a sleep mode. Stated another way, when an unauthorized person intentionally tries to wake up the electronic device, the device does not recognize the audio fingerprint of this unauthorized person, so it denies the access request by this person and remains in the sleep mode.

Audio fingerprint recognition (ASR) is also known as speaker recognition. ASR is optionally text-dependent and text-independent. Text-dependent ASR requires the authorized user to speak specific texts (e.g., an audio command) which are used to build an audio fingerprint model for this user, and subsequently the authorized user has to repeat the same specific texts during the course of user recognition. Thus, text-dependent ASR involves a stringent text control, and offers an improved accuracy of user recognition. On the other hand, text-independent ASR does not involve specific texts, and can rely on some randomly selected texts provided by the user to establish a user-specific audio fingerprint model for use in user recognition. Due to its advantage of not involving any specific content, the text-independent ASR has been widely used in the Internet to recognize authorized users by their voices regardless of the voice content.

Various embodiments of the present application apply in both text-dependent and text-independent ASR systems. In particular, the present application extensively refers to an audio wakeup system which could be a specific text-dependent ASR system and hereby used to explain the mechanism of ASR.

FIG. 1A is a comprehensive flow chart of an exemplary method 100 for recognizing an audio command issued by an authorized user of an electronic device according to some embodiment of the application. This audio command recognition method 100 primarily includes obtaining (101) generic and specific audio models, recognizing (102) the authorized user based on the audio models, and extracting the audio command (103). Specifically, the electronic device obtains (101) a universal background model, and an audio fingerprint model of the authorized user. The universal background model (UBM) is a generic audio model that represents general and person-independent audio feature characteristics, and the audio fingerprint model is a specific audio model that represents characteristic audio fingerprint features of a specific person (e.g., the authorized user).

The UBM is established when the corresponding audio model is training based on a plurality of audio data provided by a large number of speakers. "Person-independent" refers to being statistically independent of a specific speaker, although audio data of the specific speaker could have been used as a part of the audio data provided by the large number of speakers to statistically build the UBM. Different speakers provide respective audio data that optionally contain the same texts or different texts. Respective characteristic audio fingerprint features are extracted from respective audio data of each speaker, and the characteristic audio fingerprint features of the large number of speakers are used collectively to establish the UBM. In some embodiments, the UBM is based on a Gaussian Mixture model (GMM) which is optionally trained using a maximum likelihood criterion.

Each authorized user is associated with an audio fingerprint model. When the respective authorized user registers with the electronic device, he or she may provide (or register) training audio data that are used to establish an audio fingerprint model. In some embodiments, unlike the UBM, the audio fingerprint model of the authorized user is established using a relatively small amount of audio data provided by this specific authorized user. Optionally, the audio fingerprint model of the authorized user is trained using a Maximum A. Posteriori (MAP) criterion or a Maximum Likelihood Linear Regression (MLLR) criterion. In some embodiments, the authorized user also provides audio data that are used to obtain the UBM model, and however, in some embodiments, the UBM model is established without using any audio data provided by the specific authorized user.

In some embodiment, one or more audio signals are collected from the authorized user using a microphone or other audio acquisition equipments. The audio signals optionally include an audio command that is used to activate a function on the electronic device. A plurality of characteristic audio fingerprint features are extracted from the audio signals and associated with this specific authorized user. In one specific example, the characteristic audio fingerprint features are further used to build a GMM of the authorized user using Maximum-a-Posteriori self adaptation that is implemented based on the known UBM. In some embodiments, this GMM of the authorized user is applied as the audio fingerprint model for this specific authorized user.

When the audio fingerprint model is established, the authorized user registers her audio fingerprints with the electronic device or a remote server that is coupled to the electronic device. Such an audio fingerprint model may be conveniently used to identify an audio signal that is provided by the authorized user and authenticate the authorized user.

After obtaining the audio models, the electronic device obtains (102) audio data based on an audio signal provided by a user and detected by the electronic device. Characteristic audio fingerprint features are extracted in the audio data. Then, it is determined whether the corresponding audio signal is generated by an authorized user of the electronic device by comparing the characteristic audio fingerprint features in the audio data with the audio fingerprint model for the authorized user and with the UBM.

In some embodiments, when the user registered his voice with the electronic device, an audio fingerprint model is established for this user, and can be used to identify the user. For example, the user provides an audio signal that may contain a predetermined command or password. The audio signal is processed based on the audio fingerprint model for determining whether the command or password is issued by the previously registered (i.e., authorized) user.

In some embodiments, the comparison of the characteristic audio fingerprint features in the audio data with the audio fingerprint model for the authorized user and with the UBM gives a first likelihood and a second likelihood. The first likelihood quantitatively indicates to what extent the characteristic audio fingerprint features are associated with the audio fingerprint model of the authorized user, and the second likelihood quantitatively indicates to what extent the characteristic audio fingerprint features are associated with the UBM. In some embodiments, the first and second likelihoods are combined to a score, e.g., a logistic likelihood ratio (LLR). The LLR is further compared with a predetermined likelihood threshold. When the LLR is larger than the predetermined likelihood threshold, it is therefore determined that the corresponding audio signal is generated by the authorized user of the electronic device.

In some embodiment, a first similarity is computed to indicate the similarity between the characteristic audio fingerprint features and the audio fingerprint model of the authorized user. A second similarity is computed to indicate the similarity between the characteristic audio fingerprint features and the UBM. When a score indicating the difference between the first and second similarities exceeds a predefined similarity threshold, it is therefore determined that the corresponding audio signal is generated by the authorized user of the electronic device.

Specifically, characteristic audio fingerprint features of audio data are extracted from an input audio signal, and used to calculate two similarity or likelihood scores with respect to an audio fingerprint model of an authorized user and the UBM, respectively. These two similarity or likelihood scores are combined to generate a similarity or likelihood difference (e.g., score in the following equation (1)), and in some embodiments, the difference is represented in a logarithmic scale. In some embodiments, the difference, score, is represented as follows:

$$\text{score} = \frac{1}{T}\left(\log p\left(X \mid \overrightarrow{\lambda_{spk}}\right) - \log p\left(X \mid \overrightarrow{\lambda_{ubm}}\right)\right) \quad (1)$$

where X represents the characteristic audio fingerprint features, T is the number of the characteristic audio fingerprint features, $\lambda_{spk}$ represents the audio fingerprint model of the authorized user, $\lambda_{ubm}$ represents the UBM model, and $p(X|\lambda)$ is a similarity function or a likelihood function between the characteristic audio fingerprint features X and the corresponding audio fingerprint model of the specific user.

In some embodiments, when score is greater than a predetermined similarity threshold, it is determined that the user who provides the audio signal is an authorized user who has previously registered with the electronic device. On the other hand, when score is smaller than the defined similarity threshold, it is determined that the user is not the authorized user. In some embodiments, similar comparison based on equation (1) is repeated to determine whether the user that provides the audio signal is any of the other authorized users. If the user that provides the audio signal is not associated with any of the authorized users, the user is identified as an unauthorized user, and denied an access to the electronic device. In some embodiments, the electronic device displays a notification message on its display to acknowledge its failure of identifying the user as any of its authorized users, and optionally returns to a signal recording state to receive a next audio signal.

In some embodiments, the similarity function in equation (1) is computed based on a Gaussian Mixture Model.

Furthermore, after determining that the corresponding audio signal is generated by an authorized user of the electronic device, an audio command is extracted (103) from the audio data, such that an operation is operated in accordance with the audio command provided by the authorized user.

It should be understood that the particular order in which the operations in FIG. 1A have been described are merely exemplary and are not intended to indicate that the described order is the only order in which the operations could be performed. One of ordinary skill in the art would recognize various ways to recognize an audio command as described herein. Additionally, it should be noted that details of other processes described herein with respect to method 100 (e.g., FIG. 1A) are also applicable in an analogous manner to methods 150, 200 and 300 described above with respect to FIGS. 1B, 2 and 3. For brevity, these details are not repeated here.

FIG. 1B is a flow chart of an exemplary method 150 of extracting an audio command from the audio data provided by the authorized user according to some embodiment of the application.

In some embodiments, to recognize the audio command, the electronic device obtains (104) a coarse background acoustic model and a fine foreground acoustic model for the audio data. The coarse background acoustic model is configured to identify background noise in the corresponding audio signal. In some embodiments, the coarse background acoustic model is established by low-precision audio training, and has a background phoneme precision that is lower than a model threshold precision value. The fine foreground acoustic model is configured to identify the audio command in the audio signal. In some embodiments, the fine foreground acoustic model is established by high-precision audio training, and has a foreground phoneme precision that is higher than the background phoneme precision. In some embodiments, this foreground phoneme precision is higher than the model threshold precision value.

Then, a decoding method (sometimes called as "decoding path") that decodes the audio data is determined (105) according to the coarse background acoustic model and the fine foreground acoustic model, respectively. In some embodiments, the decoding method is determined for the audio command by using the fine foreground acoustic model to obtain a plurality of phonemes of the audio command, identifying the decoding method in accordance with the plurality of phonemes, and further adjusting the decoding method in accordance with the coarse background acoustic model.

In accordance with the determined decoding method, the audio data is decoded (106) to give a plurality of phonemes of an audio command. It is further determined whether the plurality of phonemes of the decoded audio command includes phonemes of a certain audio command that the electronic device may implement. In accordance with a positive determination, the decoded audio command is determined to represent (107) a valid audio command of the electronic device, and this valid audio command is thereby implemented as requested by the authorized user.

In some embodiments, method 150 is implemented to extract an audio command that wakes up an operating system or a specific function of the electronic device. For example, when an authorized user of a smart phone provides an audio signal that includes an audio command of "WeChat Secretary," the smart phone automatically recognize the phonemes associated with "WeChat Secretary," recognizes the audio command, and thereby activates a mobile application called WeChat Secretary.

In some embodiments, an acoustic model (e.g., the coarse background acoustic model and the fine foreground acoustic model) is associated with relative probabilities of an audio signal and a phoneme. A phoneme is the smallest phonetic unit divided from the audio signal in accordance with natural attributes of an audio signal. From another perspective, the phoneme is the smallest phonetic unit divided from the audio signal based on the tone of the audio signal. A pronunciation action is normally associated with a phoneme. In some embodiments, each of the coarse background acoustic model and the fine foreground acoustic model is optionally obtained by training using individual phonemes or sequences of three phonemes.

In some embodiments, a Hidden Markov Model (HMM) is used as an acoustic model to decode the audio data and obtain the audio command. The hidden Markov model is a statistical model that involves a Markov process based on one or more hidden unknown parameters. In the HMM, a state is not directly visible, but some variables affected by the state are visible. In some embodiments, a Hidden Markov Model Toolkit (HTK) is conveniently applied to train and calculate the acoustic model (e.g., the coarse background acoustic model and the fine foreground acoustic model).

In some embodiments, the coarse background acoustic model and the fine foreground acoustic model are based on a respective Gaussian Mixture Model that uses a respective characteristic Gaussian index. On one hand, in some implementations, a large amount of the audio data is preferably used to obtain an acoustic model that has a relatively low precision, e.g., the coarse background acoustic model. When the coarse background acoustic model is calculated based on a Gaussian Mixture Model (GMM), a characteristic Gaussian index B is smaller than a predetermined threshold precision value. In a specific example, the characteristic Gaussian index B is determined as 4 or 8. In accordance with a small characteristic Gaussian index B, the GMM effectively extracts characteristic audio fingerprint features of a speaker, and eliminates syntactic elements and other redundant information in an audio signal, such that a statistical distribution of the speaker's characteristic audio fingerprint features is accurately captured.

In some embodiments, the coarse background acoustic model is obtained based on training and calculation that uses monophones having relatively low precisions or triphones having relatively high precisions. In a specific example, when monophones are used to train the coarse background acoustic model, the corresponding characteristic Gaussian index B is smaller than a predetermined threshold precision value, and equal to 4. In another example, when triphones are used to train the coarse background acoustic model, each triphone includes a sequence of three monophones, and has to be processed in a group of three monophones. The corresponding characteristic Gaussian index B is smaller than a predetermined threshold precision value, and equal to 8.

On the other hand, in some implementation, a large amount of the audio data is also preferably used to obtain an acoustic model that has a relatively higher precision, e.g., the fine foreground acoustic model. When the fine foreground acoustic model is calculated based on a Gaussian Mixture Model (GMM), a characteristic Gaussian index Q is larger than a predetermined threshold precision value. Moreover, the characteristic Gaussian index Q is substantially larger than the characteristic Gaussian index B. In a specific example, the characteristic Gaussian index Q is determined as 16, 32 or a number larger than 32.

In some embodiments, the fine foreground acoustic model is also obtained based on training and calculation that uses monophones having relatively low precisions or triphones having relatively high precisions. In a specific example, when monophones are used to train the coarse background acoustic model, the monophones optionally include an enhanced HMM sequence. Specifically, the corresponding characteristic Gaussian index Q has a relatively high value, such as 32 or larger. In another example, when triphones are used to train the fine foreground acoustic model, the corresponding characteristic Gaussian index Q is larger than the predetermined threshold precision value, and equal to 16 or 32. Then, in some embodiments, one or more monophones or one or more triphones are identified for the phonemes associated with an audio command. The identified monophones or triphones are further used in self-adaptive computation for determining a monophone-based or triphone-based foreground acoustic model.

In some implementations, the methods of establishing an acoustic model in the aforementioned embodiments may be combined to implement method 100 which recognizes an audio command in an audio signal.

In some implementations, the electronic device obtains (104) a coarse background acoustic model that has a precision value lower than a threshold precision value, and a fine foreground acoustic model that that has a precision value higher than the threshold precision value. In a specific example, the threshold precision value is equal to 10. Then, a decoding method that decodes the audio data is determined (105) according to the coarse background acoustic model and the fine foreground acoustic model. In accordance with the determined decoding method, the audio data is decoded (106) to give a plurality of phonemes of an audio command. It is further determined whether the plurality of phonemes of the decoded audio command includes phonemes of a certain audio command that the electronic device may implement. In accordance with a positive determination, the decoded audio command is determined to represent (107) a valid audio command of the electronic device, and this valid audio command is thereby implemented as requested by the authorized user.

Further, in some embodiments, the electronic device obtains (104) a coarse background acoustic model that has a precision value lower than a threshold precision value, and a fine foreground acoustic model that that has a precision value higher than the threshold precision value. Both acoustic models are established based on Gaussian Mixture Modeling. The characteristic Gaussian indexes B and Q are associated with the respective precision value of the background acoustic model and the foreground acoustic model, respectively, and Q is substantially larger than B.

Further, in some embodiments, the electronic device obtains (104) a background acoustic model that has a precision value lower than a threshold precision value. Optionally, the coarse background acoustic model is established based on training and calculation that uses monophones. Optionally, the coarse background acoustic model is established based on training and calculation that uses triphones. Each triphone includes a sequence of three monophones, and has to be processed in a group of three monophones.

Further, in some embodiments, the electronic device obtains (104) a fine foreground acoustic model that that has a precision value higher than the threshold precision value. Optionally, the fine foreground acoustic model is established based on training and calculation that uses monophones. One or more monophones are identified for the phonemes associated with an audio command. The identified monophones are further used in self-adaptive computation for determining a monophone-based foreground acoustic model. Optionally, the fine foreground acoustic model is established based on training and calculation that uses triphones. Each triphone includes a sequence of three monophones, and has to be processed in a group of three monophones. One or more triphones are identified for the phonemes associated with an audio command. The identified triphones are further used in self-adaptive computation for determining a triphone-based foreground acoustic model.

In some embodiments, a decoding method that decodes the audio data is determined (105) according to the coarse background acoustic model and the fine foreground acoustic model, respectively. In some embodiments, for each audio command of a plurality of audio commands, the decoding method is determined by using the fine foreground acoustic model to obtain a plurality of phonemes of the respective audio command, identifying the decoding method in accordance with the plurality of phonemes, and further adjusting the decoding method in accordance with the coarse background acoustic model.

In some implementations, it is determined whether the audio data are generated by a human voice, after the audio data is provided by the user. The characteristic audio fingerprint features are extracted from the audio data in accordance with a positive determination that the audio data are generated by a human voice.

It should be understood that the particular order in which the operations in FIG. 1B have been described are merely exemplary and are not intended to indicate that the described order is the only order in which the operations could be performed. One of ordinary skill in the art would recognize various ways to extract an audio command as described herein. Additionally, it should be noted that details of other processes described herein with respect to method 150 (e.g., FIG. 1B) are also applicable in an analogous manner to methods 100, 200 and 300 described above with respect to FIGS. 1A, 2 and 3. For brevity, these details are not repeated here.

Figure 2:
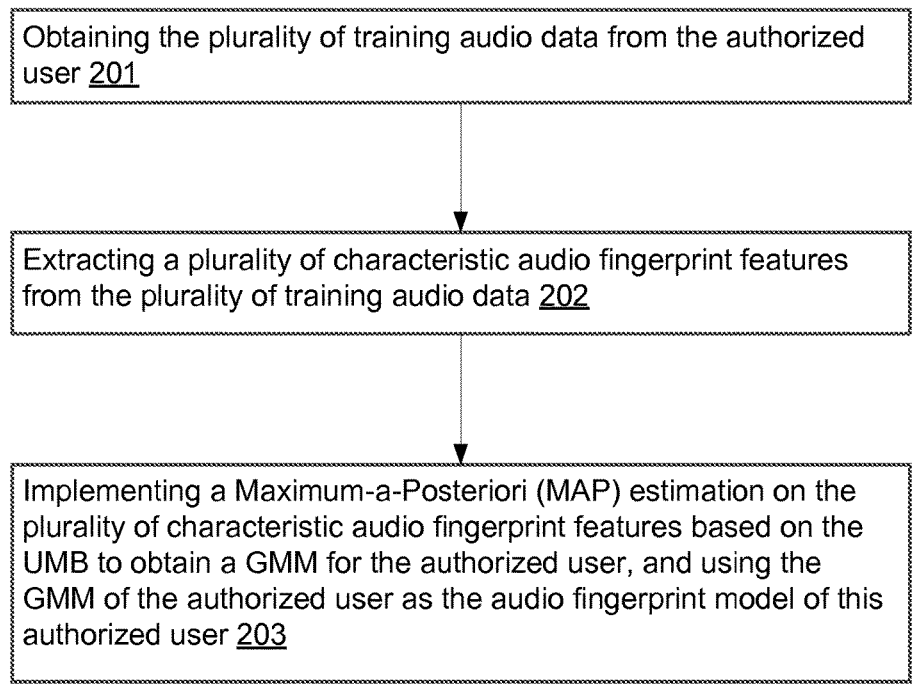
FIG. 2 is a flow chart of an exemplary method for determining an audio fingerprint model for an authorized user according to some embodiment of the application.

FIG. 2 is a flow chart of an exemplary method 200 for determining an audio fingerprint model for an authorized user according to some embodiment of the application. The electronic device obtains (201) a plurality of training audio data from the authorized user, when the user registers on the electronic device. In some embodiments, the plurality of training audio data includes a plurality of audio commands each of which is used to activate a function of the electronic device. Then, a plurality of characteristic audio fingerprint features is extracted (202) from the plurality of training audio data. A Maximum-a-Posteriori (MAP) estimation is implemented (203) on the plurality of characteristic audio fingerprint features based on the UMB, such that a GMM is obtained for the authorized user. The GMM of the authorized user is further used (203) as the audio fingerprint model of this authorized user.

Specifically, in some embodiments, when the user registers his audio fingerprint, the user utters the plurality of training audio data including one or more command words. In some embodiments, a password to unlock a system is also inputted as a command word, and for example, in a wakeup application, a password is processed as an audio command (e.g., a wakeup command). The electronic device acquires, through the microphone, the plurality of training audio data including the wakeup command. Optionally, training related to the wakeup command is performed locally to give an audio fingerprint model of the specific user. Optionally, the training based on the wakeup command may be performed on a remote server. For example, the training audio data acquired by the microphone are compressed and transferred to the remote server via a network. After receiving the audio data transferred by the electronic device, the remote server extracts the characteristic audio fingerprint features of the speaker associated with the audio command, and some examples of the characteristic audio fingerprint features include, but are not limited to, Mel Frequency Cepstral Coefficients (MFCC) and Linear Predictive Cepstral Coefficients (LPCC). In some embodiments, such characteristic audio fingerprint features are arranged in an ordered sequence which is further used for training the audio fingerprint model. In some embodiments, the training includes: using a large amount of audio data to train a universal background model based on a GMM model, implementing a Maximum-a-Posteriori estimation on the characteristic audio fingerprint features of the training audio data, and establishing a GMM model of the user based on the UBM model.

Optionally, method 200 for determining the audio fingerprint model is implemented on the electronic device. Optionally, method 200 is implemented on a remote server (e.g., a cloud server used in cloud computing), and the universal background model and the audio fingerprint model of the authorized user are transferred to the electronic device via a communication network. Stated another way, in many embodiments, the electronic device that establishes the acoustic fingerprint model could refer to the remote server.

The audio fingerprint model associated with a specific authorized user is used in many applications, such as in a wakeup system. In the wakeup system, the electronic device is set up to be activated from a sleep mode only if the authorized user of the electronic device issues a valid audio command. Thus, in accordance with the audio command, the electronic device wakes up from a sleep mode without receiving a manual input on its input/output interface. Moreover, methods 100 and 200 extract the characteristic audio fingerprint features of the authorized user, and use them to authenticate the identity of the specific authorized user. Due to the uniqueness of the characteristic audio fingerprint features, user identification based on methods 100 and 200 enhances the security level for the electronic device.

It should be understood that the particular order in which the operations in FIG. 2 have been described are merely exemplary and are not intended to indicate that the described order is the only order in which the operations could be performed. One of ordinary skill in the art would recognize various ways to determine an audio fingerprint model as described herein. Additionally, it should be noted that details of other processes described herein with respect to method 200 (e.g., FIG. 2) are also applicable in an analogous manner to methods 100, 150 and 300 described above with respect to FIGS. 1A, 1B and 3. For brevity, these details are not repeated here.

Figure 3:
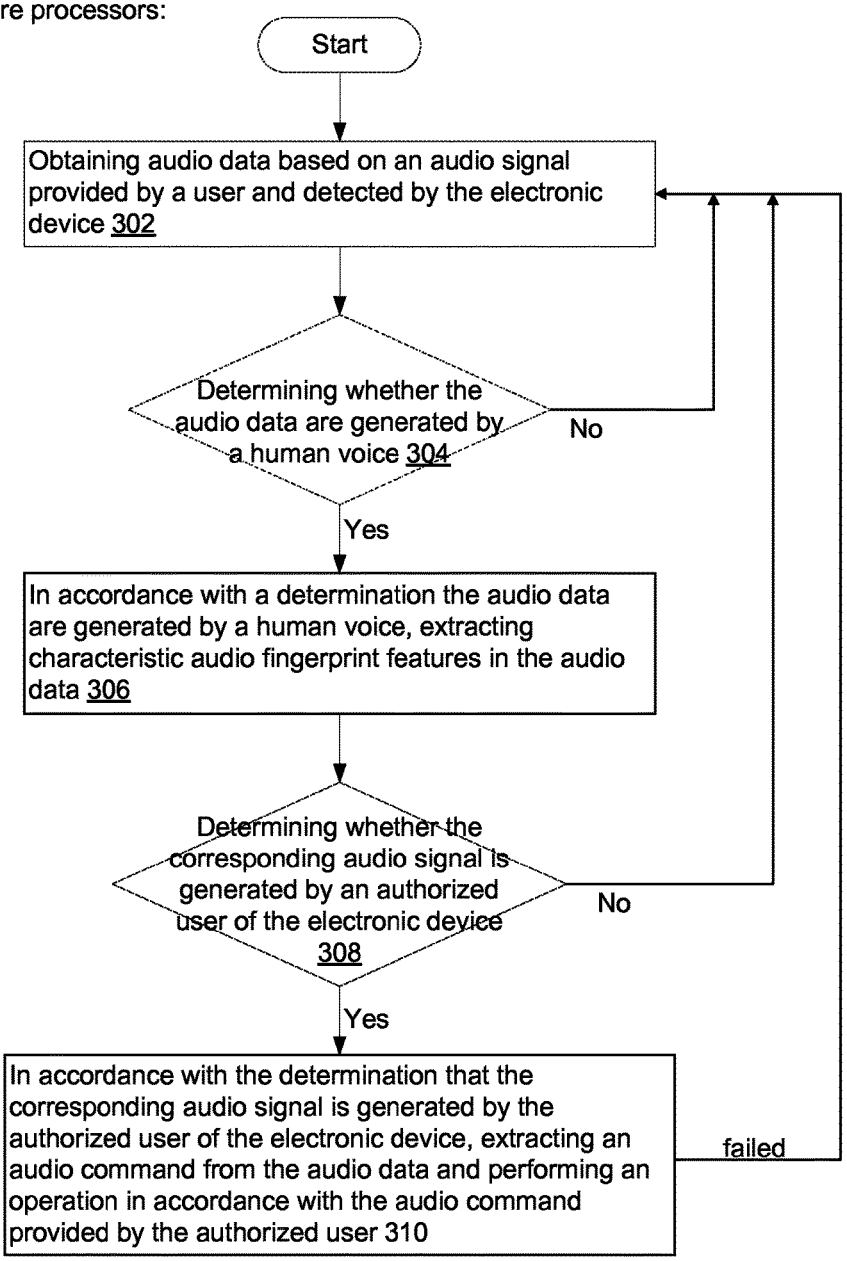
FIG. 3 is a flow chart of an exemplary method for recognizing an audio command that is included in an audio signal provided by an authorized user of an electronic device according to some embodiment of the application.

FIG. 3 is a flow chart of an exemplary method 300 for recognizing an audio command that is included in an audio signal provided by an authorized user of an electronic device according to some embodiment of the application. Audio data are obtained (302) based on an audio signal provided by a user and detected by the electronic device. Then, it is optionally determined (304) whether the audio data are generated by a human voice. In accordance with a determination the audio data are generated by a human voice, characteristic audio fingerprint features are extracted (306) in the audio data. It is further determined (308) whether the corresponding audio signal is generated by an authorized user of the electronic device. Specifically, in some embodiments, the characteristic audio fingerprint features in the audio data are compared with a predetermined audio fingerprint model for the authorized user and with a predetermined universal background model (UBM) that represents user-independent audio fingerprint features, respectively. In accordance with the determination that the corresponding audio signal is generated by the authorized user of the electronic device, an audio command is extracted (310) from the audio data, and an operation is performed (310) in accordance with the audio command provided by the authorized user.

In some embodiments, the audio signal includes an audio command to wake up the electronic device from a sleep mode. An authorized user is prompted to provide a plurality of audio data including an audio wakeup command for a registration purpose, and an audio fingerprint model of the authorized user is obtained based on the provided audio data. Thereafter, the audio fingerprint model of the authorized user is subsequently applied in method 300 to determine whether a user who provides a sound signal is the authorized user.

In some embodiments, the electronic device determines whether the corresponding audio signal is generated by the authorized user of the electronic device, independently of the content of the corresponding audio signal provided by the user.

Further, in some embodiments, an audio signal that includes a plurality of command words is provided by an authorized user. The plurality of command words may be associated with a relatively complicated function of the electronic device, such as making a phone call to a specific person and sending a short message.

It should be understood that the particular order in which the operations in FIG. 3 have been described are merely exemplary and are not intended to indicate that the described order is the only order in which the operations could be performed. One of ordinary skill in the art would recognize various ways to recognize an audio command as described herein. Additionally, it should be noted that details of other processes described herein with respect to method 300 (e.g., FIG. 3) are also applicable in an analogous manner to methods 100 and 200 described above with respect to FIGS. 1 and 2. For brevity, these details are not repeated here.

In various embodiments of the present application, methods 100, 150, 200 and 300 are, optionally, governed by instructions that are stored in a non-transitory computer readable storage medium and that are executed by one or more processors of an electronic device. Each of the operations shown in FIGS. 1A, 1B, 2 and 3 may correspond to instructions stored in a computer memory or non-transitory computer readable storage medium. The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 100, 150, 200 or 300 may be combined and/or the order of some operations may be changed.

Figure 4:
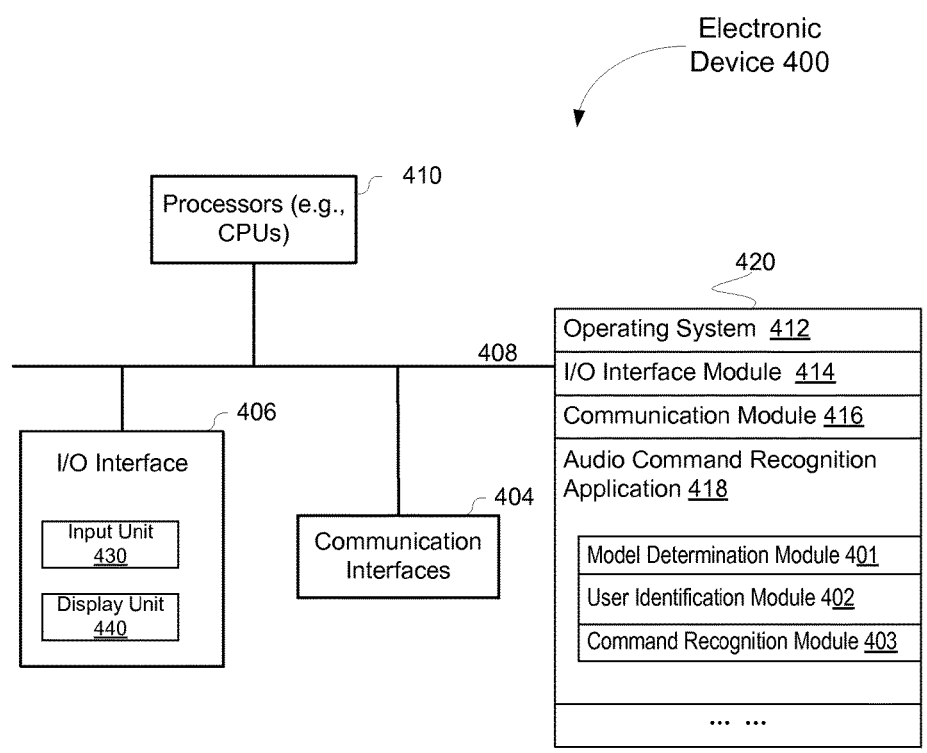
FIG. 4 is a block diagram of an electronic device that recognizes an audio command that is included in an audio signal provided by an authorized user of the electronic device according to some embodiment of the application.

FIG. 4 is a block diagram of an electronic device 400 that recognizes an audio command that is included in an audio signal provided by an authorized user of the electronic device according to some embodiment of the application. In accordance with various embodiments of the application, electronic device 400 is applied to establish audio fingerprint models of different authorized users and recognize an audio command provided by an authorized user as shown in FIGS. 1A, 1B, 2 and 3. In some implementations, electronic device 400 at least includes one or more processors 410 (e.g., central processing units) and a memory 420 for storing data, programs and instructions for execution by one or more processors 410. In some implementations, electronic device 400 further includes one or more communication interfaces 404, an input/output (I/O) interface 406, and one or more communication buses 408 that interconnect these components.

In some embodiments, I/O interface 406 includes an input unit 430 and a display unit 440. Examples of input unit 430 include a keyboard, a mouse, a touch pad, a game controller, a function key, a trackball, a joystick, a microphone, a camera and the like. Additionally, display unit 440 displays information that is inputted by the user or provided to the user for review. Examples of display unit 440 include, but are not limited to, a liquid crystal display (LCD) and an organic light-emitting diode (OLED) display. In some implementations, input unit 430 and display unit 440 are integrated on a touch-sensitive display that displays a graphical user interface (GUI).

In some embodiments, communication interface 404 include circuitry (sometimes called a chipset) that interconnects and controls communications between system components. In some embodiments, memory 420 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. In some embodiments, memory 420 includes one or more storage devices remotely located from the one or more processors 410. In some embodiments, memory 420, or alternatively the non-volatile memory device(s) within memory 420, includes a non-transitory computer readable storage medium.

In some embodiments, memory 420 or alternatively the non-transitory computer readable storage medium of memory 420 stores the following programs, modules and data structures, instructions, or a subset thereof:

- Operating System 412 that includes procedures for handling various basic system services and for performing hardware dependent tasks;
- I/O interface module 414 that includes procedures for handling various basic input and output functions through one or more input and output devices;
- Communication module 416 that is used for connecting electronic device 400 to other electronic device 400, via one or more network communication interfaces 404 (wired or wireless) and one or more communication networks, such as the Internet, other wide area networks, local area networks, metropolitan area networks, and so on; and
- Audio command recognition module 418 that includes a model determination module 401, a user identification module 402, and a command recognition module 403.

In some embodiments, model determination module 401 is used to obtain a universal background model that represents user-independent audio fingerprint features, and an audio fingerprint model of an authorized user based on audio data provided by the authorized user. User identification module 402 is used to receive an audio signal, extract the characteristic audio fingerprint features of the audio signal, and determine whether the audio signal is provided by an authorized user based on the characteristic audio fingerprint features of the audio signal, the universal background model and the audio fingerprint model of the authorized user. Command recognition module 403 is used to recognize in the audio signal an audio command including one or more command words, when it has been determined that the speech originates from the authorized user. More details and examples of functions of modules 401, 402 and 403 are explained above with reference to FIGS. 1A, 1B, 2 and 3.

In some embodiment, the user identification module 402 is used to determine the similarity between the characteristic audio fingerprint features and the audio fingerprint model of the authorized user, and the similarity between the characteristic audio fingerprint features and the universal background model. When the difference between the similarity between the characteristic audio fingerprint features and the audio fingerprint model of the authorized user and the similarity between the characteristic audio fingerprint features and the universal background model is greater than a predefined threshold, it is determined that the audio signal originates from a registered user.

In some embodiment, the model determination module 401 is used to acquire an audio signal including command words and provided by the user, extract the characteristic audio fingerprint features of the user from the audio signal, and adaptively obtain a Gaussian mixture model of the user for use as the audio fingerprint model of the user. The audio fingerprint model of the user is established based on the universal background model using a maximum a posteriori adaptation of the characteristic audio fingerprint features of the user.

In some embodiment, the command recognition module 403 is used to perform an acoustic model training and calculation with a precision lower than a specified precision on the audio signal to get a background acoustic model, perform an acoustic model training and calculation with a precision higher than a specified precision on the audio signal to get a foreground acoustic model, and build a decoder network (also called a decoding method) in accordance with the foreground acoustic model and the background acoustic model. Building the decoder network further includes selecting the phonemes contained in the command words from the foreground acoustic model, building a decoding path (also called as "decoding method") corresponding to the command words by using the selected phonemes, and building a corresponding decoding path in accordance with the phonemes of the background acoustic model, decode the input audio signal by the decoder network, determine whether the decoding result is associated with a valid audio command after the audio signal ends, and trigger an operation corresponding to the audio command if the decoding result is associated with a valid audio command.

In some embodiment, in the process of performing an acoustic model training and calculation with a precision lower than a specified precision on the audio signal, the characteristic Gaussian index B in a Gaussian mixture model for describing the phonemes is lower than a specified value. In the process of performing an acoustic model training and calculation with a precision higher than a specified precision on the audio signal, the characteristic Gaussian index Q in a Gaussian mixture model for describing the phonemes is higher than a specified value, and Q is greater than B.

In some embodiment, the command recognition module 403 is used to perform an acoustic model training and calculation with the monophones on the audio signal, and employ the obtained monophone acoustic model as the background acoustic model. Alternatively, the command recognition module 403 is used to perform an acoustic model training and calculation with the triphones on the audio signal to get a triphone acoustic model, cluster the triphones in the triphone acoustic model, and employ the clustered triphone acoustic model as the background acoustic model.

In some embodiment, the command recognition module 403 is used to perform an acoustic model training with the triphones on the audio signal, perform an adaptive computation on the obtained triphone acoustic model by using the audio corresponding to the command words, and employ the triphone acoustic model after the adaptive computation as the foreground acoustic model; and perform an acoustic model training and calculation with the monophones on the audio signal, wherein the characteristic Gaussian index in a Gaussian mixture model for describing the monophones is higher than a specified high value, perform an adaptive computation on the obtained monophone acoustic model by using the audio corresponding to the command words, and employ the monophone acoustic model after the adaptive computation as the background acoustic model.

In some embodiment, the command recognition module 403 is used to select the phonemes contained in every command word from the foreground acoustic model; build a decoding path corresponding to the command word by using the selected phonemes contained in the command word, for each command word; and build a corresponding decoding path in accordance with all the phonemes of the background acoustic model.

In some embodiment, an audio activity detection unit (not shown) is further included. The audio activity detection unit is used to perform audio activity detection on the audio signal. In accordance with a determination that the audio signal contains human voice, the user recognition unit extracts the characteristic audio fingerprint features of the audio signal.

The methods shown in FIGS. 1A, 1B, 2 and 3 may be integrated into the hardware entity of various networks. For example, the method for audio command recognition may be integrated into a feature phone, smart phone, palmtop computer, personal computer (PC), tablet computer, personal digital assistant (PDA), or the like.

In practice, the method for audio command recognition provided in the embodiment of the present application may be implemented in a plurality of forms. For example, the method for audio command recognition may be written as a plug-in program installed in a server for natural language processing by following certain specification of application program interfaces, and may also be packaged as an application for download and use by users. When written as a plug-in, it may be implemented as ocx, dll, cab and other types of plug-in. The method for audio command recognition provided in the embodiment of the present application may also be implemented with a Flash plug-in, RealPlayer plug-in, MMS plug-in, MI stave plug-in, ActiveX plug-in, and the like.

The method for audio command recognition provided in the embodiment of the present application may be stored on various storage media by ways of storage of instruction or instruction set. These storage media include, but are not limited to, floppy disk, optical disc, DVD, hard disk, NAND flash, U disk, CF card, SD card, MMC card, SM card, memory stick, xD card, and the like.

Moreover, the method for audio command recognition provided in the embodiment of the present application may be applied to the storage media based on the Nand flash, such as U disk, CF card, SD card, SDHC card, MMC card, SM card, memory stick, xD card, and the like.

In conclusion, in the embodiment of the present application, a universal background model is obtained, and an audio fingerprint model of a user is obtained based on the audio signal of the user; an audio signal is received, the characteristic audio fingerprint features of the audio signal are extracted, and it is determined whether the audio signal originates from the user based on the characteristic audio fingerprint features of the audio signal, the universal background model, and the audio fingerprint model of the authorized user; and the command words in the audio signal are recognized when it is determined that the audio signal originates from the user. By applying the embodiment of the present application, it may be determined whether the audio signal originates from the registered user based on the audio fingerprint model of the registered user, thereby increasing the security.

Also, in the audio wakeup application, according to the embodiment of the present application, the user can be identified by the way of audio fingerprint recognition, thereby ensuring that the system can only be waked up by the user per se.

The above description is only the preferred embodiments of the present application, and not used to limit the protection scope of the present application. Any modifications, equivalent substitutions, and improvements made within the spirit and principle of the present application should be encompassed within the protection scope of the present application.

While particular embodiments are described above, it will be understood it is not intended to limit the application to these particular embodiments. On the contrary, the application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present application. First ranking criteria and second ranking criteria are both ranking criteria, but they are not the same ranking criteria.

The terminology used in the description of the application herein is for the purpose of describing particular embodiments only and is not intended to be limiting of the application. As used in the description of the application and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the application to the precise forms disclosed. Many modifications and variations are possible in view of the above teachings. The implementations were chosen and described in order to best explain principles of the application and its practical applications, to thereby enable others skilled in the art to best utilize the application and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A method, comprising:
at an electronic device having one or more processors and memory storing program modules to be executed by the one or more processors:
obtaining audio data based on an audio signal provided by a user and detected by the electronic device while the electronic device is in a sleep mode, the audio data including a command to be performed by the electronic device after being activated from the sleep mode;
determining whether the audio signal is generated by a human voice;
in accordance with a determination that the audio signal is generated by the human voice, extracting characteristic audio fingerprint features in the audio data;
determining whether the corresponding audio signal is generated by an authorized user of the electronic device by comparing the characteristic audio fingerprint features in the audio data with a predetermined command-dependent audio fingerprint model for the authorized user and with a predetermined universal background model (UBM) that represents user-independent audio fingerprint features, respectively, wherein the predetermined command-dependent audio fingerprint model is established based on a plurality of training audio data that include at least one instance of audio signal including the command provided by the authorized user when the authorized user registers with the electronic device;
in accordance with the determination that the corresponding audio signal is generated by the authorized user of the electronic device,
activating the electronic device from the sleep mode;
extracting the command from the audio data, wherein the extracting comprises:
obtaining a coarse background acoustic model for the audio data, the coarse background acoustic model being configured to identify background noise in the corresponding audio signal and having a background phoneme precision;
obtaining a fine foreground acoustic model for the audio data, the fine foreground acoustic model being configured to identify the command in the audio signal and having a foreground phoneme precision that is higher than the background phoneme precision; and
decoding the audio data according to the coarse background acoustic model and the fine foreground acoustic model; and
performing an operation in accordance with the command; and
in accordance with the determination that the corresponding audio signal is not generated by the authorized user of the electronic device, keeping the electronic device in the sleep mode.

2. The method of claim 1, wherein the predetermined UBM is established based on a plurality of audio data provided by a plurality of users.

3. The method of claim 1, wherein the predetermined UBM is obtained based on a Gaussian Mixture Model (GMM) from a large amount of audio data using a maximum likelihood criterion.

4. The method of claim 1, further comprising:
building the predetermined audio fingerprint model for the authorized user based on a plurality of training audio data provided by the authorized user, the audio fingerprint model being established using a criterion selected from a Maximum A. Posteriori (MAP) criterion and a Maximum Likelihood Linear Regression (MLLR) criterion.

5. The method of claim 1, wherein determining whether the corresponding audio signal is generated by the authorized user of the electronic device further comprising:
calculating a score based on the characteristic audio fingerprint features in the audio data, the predetermined audio fingerprint model for the authorized user and the predetermined UBM; and
determining whether the score exceeds a threshold value.

6. The method of claim 5, wherein the score is calculated based on a formula as follows:

$$\text{score} = \frac{1}{T}\left(\log p\left(X \mid \lambda_{\overrightarrow{spk}}\right) - \log p\left(X \mid \lambda_{\overrightarrow{ubm}}\right)\right);$$

wherein X is the characteristic audio fingerprint features in the audio data, T is the number of the characteristic audio fingerprint features, $\lambda_{spk}$ is the predetermined audio fingerprint model for the authorized user, $\lambda_{ubm}$ is the UBM model, and $p(X|\lambda)$ is a similarity function between the characteristic audio fingerprint features X and the corresponding model.

7. The method of claim 6, wherein the similarity function is computed based on a Gaussian Mixture Model.

8. The method of claim 1, wherein each of the coarse background acoustic model and the fine foreground acoustic model are obtained by training using individual phonemes or sequences of three phonemes.

9. The method of claim 1, wherein the coarse background acoustic model and the fine foreground acoustic model are based on a respective Gaussian Mixture Model that uses a respective characteristic Gaussian index.

10. The method of claim 9, wherein the characteristic Gaussian index for the coarse background model is lower than a threshold precision value, and the characteristic Gaussian index for the fine foreground model is higher than the threshold precision value.

11. The method of claim 10, wherein the threshold precision value is equal to 8.

12. The method of claim 1, wherein the electronic device determines whether the corresponding audio signal is generated by the authorized user of the electronic device, independently of the content of the corresponding audio signal provided by the user.

13. An electronic device, comprising:
one or more processors; and
memory having instructions stored thereon, which when executed by the one or more processors cause the processors to perform operations, comprising instructions to:
obtain audio data based on an audio signal provided by a user and detected by the electronic device while the electronic device is in a sleep mode, the audio data including a command to be performed by the electronic device after being activated from the sleep mode;
determine whether the audio signal is generated by a human voice;
in accordance with a determination that the audio signal is generated by the human voice, extract characteristic audio fingerprint features in the audio data;
determine whether the corresponding audio signal is generated by an authorized user of the electronic device by comparing the characteristic audio fingerprint features in the audio data with a predetermined command-dependent audio fingerprint model for the authorized user and with a predetermined universal background model (UBM) that represents user-independent audio fingerprint features, respectively, wherein the predetermined command-dependent audio fingerprint model is established based on a plurality of training audio data that include at least one instance of audio signal including the command provided by the authorized user when the authorized user registers with the electronic device;
in accordance with the determination that the corresponding audio signal is generated by the authorized user of the electronic device,
activate the electronic device from the sleep mode;
extract the command from the audio data, wherein the extraction comprises:
obtaining a coarse background acoustic model for the audio data, the coarse background acoustic model being configured to identify background noise in the corresponding audio signal and having a background phoneme precision;
obtaining a fine foreground acoustic model for the audio data, the fine foreground acoustic model being configured to identify the command in the audio signal and having a foreground phoneme precision that is higher than the background phoneme precision; and
decoding the audio data according to the coarse background acoustic model and the fine foreground acoustic model; and
perform an operation in accordance with the command; and
in accordance with the determination that the corresponding audio signal is not generated by the authorized user of the electronic device, keep the electronic device in the sleep mode.

14. The electronic device of claim 13, wherein the instructions to determine whether the corresponding audio signal is generated by the authorized user of the electronic device further comprise instructions to:
calculate a score based on the characteristic audio fingerprint features in the audio data, the predetermined audio fingerprint model for the authorized user and the predetermined UBM; and
determine whether the score exceeds a threshold value.

15. The electronic device of claim 13, wherein the predetermined UBM is established based on a plurality of audio data provided by a plurality of users.

16. A non-transitory computer readable storage medium storing at least one program configured for execution by at least one processor of an electronic device, the at least one program comprising instructions to:
obtain audio data based on an audio signal provided by a user and detected by the electronic device while the electronic device is in a sleep mode, the audio data including a command to be performed by the electronic device after being activated from the sleep mode;
determine whether the audio signal is generated by a human voice;
in accordance with a determination that the audio signal is generated by the human voice, extract characteristic audio fingerprint features in the audio data;
determine whether the corresponding audio signal is generated by an authorized user of the electronic device by comparing the characteristic audio fingerprint features in the audio data with a predetermined command-dependent audio fingerprint model for the authorized user and with a predetermined universal background model (UBM) that represents user-independent audio fingerprint features, respectively, wherein the predetermined command-dependent audio fingerprint model is established based on a plurality of training audio data that include at least one instance of audio signal including the command provided by the authorized user when the authorized user registers with the electronic device;
in accordance with the determination that the corresponding audio signal is generated by the authorized user of the electronic device,
activate the electronic device from the sleep mode;
extract the command from the audio data, wherein the extraction comprises:
obtaining a coarse background acoustic model for the audio data, the coarse background acoustic model being configured to identify background noise in the corresponding audio signal and having a background phoneme precision;
obtaining a fine foreground acoustic model for the audio data, the fine foreground acoustic model being configured to identify the command in the audio signal and having a foreground phoneme precision that is higher than the background phoneme precision; and
decoding the audio data according to the coarse background acoustic model and the fine foreground acoustic model; and
perform an operation in accordance with the command; and
in accordance with the determination that the corresponding audio signal is not generated by the authorized user of the electronic device, keep the electronic device in the sleep mode.

17. The non-transitory computer readable storage medium of claim 16, the at least one program further comprising instructions to:
build the predetermined audio fingerprint model for the authorized user based on a plurality of training audio data provided by the authorized user, the audio fingerprint model being established using a criterion selected from a Maximum A. Posteriori (MAP) criterion and a Maximum Likelihood Linear Regression (MLLR) criterion.

* * * * *